US009608805B2

(12) United States Patent
Milsted

(10) Patent No.: US 9,608,805 B2
(45) Date of Patent: Mar. 28, 2017

(54) ENCRYPTION KEY GENERATION

(71) Applicant: OMLIS LIMITED, Newcastle Upon Tyne, Tyne and Wear (GB)

(72) Inventor: Markus Milsted, Newcastle Upon Tyne (GB)

(73) Assignee: OMLIS LIMITED, London (GB)

( * ) Notice: Subject to any disclaimer, the term of this patent is extended or adjusted under 35 U.S.C. 154(b) by 0 days.

(21) Appl. No.: 14/401,956

(22) PCT Filed: May 17, 2013

(86) PCT No.: PCT/GB2013/051284
§ 371 (c)(1),
(2) Date: Nov. 18, 2014

(87) PCT Pub. No.: WO2013/171507
PCT Pub. Date: Nov. 21, 2013

(65) Prior Publication Data
US 2015/0131796 A1    May 14, 2015

(30) Foreign Application Priority Data
May 18, 2012    (GB) .................................. 1208750.8

(51) Int. Cl.
*H04L 9/14* (2006.01)
*H04L 9/08* (2006.01)
(Continued)

(52) U.S. Cl.
CPC .......... *H04L 9/0816* (2013.01); *G06K 7/1434* (2013.01); *G06K 19/14* (2013.01);
(Continued)

(58) Field of Classification Search
CPC .............................................. H04L 2012/5672
See application file for complete search history.

(56) References Cited

U.S. PATENT DOCUMENTS

| 5,608,801 A | 3/1997 | Aiello et al. |
| 2003/0226025 A1* | 12/2003 | Lin .......................... G06F 21/78 713/193 |
| 2006/0156187 A1 | 7/2006 | Wu et al. |
| 2006/0251250 A1 | 11/2006 | Ruggiero et al. |
| 2008/0210754 A1 | 9/2008 | Lovett |
| 2011/0208659 A1 | 8/2011 | Easterly et al. |

FOREIGN PATENT DOCUMENTS

| GB | 2478712 A | 9/2011 |
| GB | 2489247 A | 9/2012 |
| WO | WO 2012111019 A1 | 8/2012 |

OTHER PUBLICATIONS

Dierks, T., Allen, C., "The TLS Protocol Version 1.0," Network Working Group, The Internet Society, 64 pages, (Jan. 1, 1999).
(Continued)

*Primary Examiner* — Josnel Jeudy
(74) *Attorney, Agent, or Firm* — Rothwell, Figg, Ernst & Manbeck PC

(57) ABSTRACT

A method of generating an encryption key. The method comprises collecting a plurality of user defined variables defined by input from a user and collecting a plurality of environmental variables associated with varying environmental conditions. The method further comprises defining parameters of a plurality of scrambling functions using the user defined variables and calculating a plurality of scramble values. Each scramble value comprises a combination of environmental variables combined in accordance with one of the plurality of scrambling functions. The method further comprises combining the scramble values to produce a scramble code and generating the encryption key from the scramble code.

20 Claims, 6 Drawing Sheets

(51) Int. Cl.
  *G09C 5/00* (2006.01)
  *H04L 9/32* (2006.01)
  *G06Q 20/32* (2012.01)
  *G06K 7/14* (2006.01)
  *G06K 19/14* (2006.01)
  *G06Q 20/40* (2012.01)

(52) U.S. Cl.
  CPC ......... *G06Q 20/3274* (2013.01); *G06Q 20/40* (2013.01); *G09C 5/00* (2013.01); *H04L 9/0869* (2013.01); *H04L 9/14* (2013.01); *H04L 9/3242* (2013.01); *H04L 2209/56* (2013.01)

(56) References Cited

OTHER PUBLICATIONS

Menzes, A.J., et al., "Handbook of Applied Cryptography, Chapter 5—Pseudorandom Bits and Sequences," CRC Press, Boca Raton, FL, USA, ISBN 978-0-8493-8523-0, pp. 169-190, (Jan. 1, 1997).
International Search Report and Written Opinion issued in International Application No. PCT/GB2013/051284, 13 pages (Oct. 4, 2013).
Combined Search and Examination Report issued in Great Britain Application No. GB1208750.8, 6 pages (Jun. 17, 2013).
International Preliminary Report on Patentability issued in International Application No. PCT/GB2013/051284, 8 pages (Nov. 18, 2014).

* cited by examiner

Table start = 0
Function = Add(+)

| 0 | 1 | 2 | 3 |
|---|---|---|---|
| 4 | [5] | 6 | 7 |
| 8 | 9 | 0 | 1 |
| 2 | 3 | 4 | 5 |

10+5 =15

Table start = 4
Function = Multiply by $x^2$

| 4 | 5 | 6 | 7 |
|---|---|---|---|
| 8 | [9] | 0 | 1 |
| 2 | 3 | 4 | 5 |
| 0 | 1 | 2 | 3 |

$10 \times 9^2$ =810

Table start = 0
Function = Add(+)

| 0 | 1 | 2 | 3 |
|---|---|---|---|
| 4 | [5] | 6 | 7 |
| 8 | 9 | 0 | 1 |
| 2 | 3 | 4 | 5 |

10+5 =15

Table start = 1
Function = Multiply (x)

| 1 | 2 | 3 | 4 |
|---|---|---|---|
| 5 | [6] | 7 | 8 |
| 9 | 0 | 1 | 2 |
| 3 | 4 | 5 | 6 |

10x6 =60

Table start = 1
Function = Multiply(x)

| 1 | 2 | 3 | 4 |
|---|---|---|---|
| 5 | [6] | 7 | 8 |
| 9 | 0 | 1 | 2 |
| 3 | 4 | 5 | 6 |

10x6 =60

Table start = 9
Function = Multiply by $x^2$

| 9 | 0 | 1 | 2 |
|---|---|---|---|
| 3 | [4] | 5 | 6 |
| 7 | 8 | 9 | 0 |
| 1 | 2 | 3 | 4 |

$10 \times 4^2$ =160

Table start = 8
Function = Raise to the power x/2

| 8 | 9 | 0 | 1 |
|---|---|---|---|
| 1 | [2] | 3 | 4 |
| 5 | 6 | 7 | 8 |
| 9 | 0 | 1 | 2 |

10-2 =8

Table start = 0
Function = add(+)

| 0 | 1 | 2 | 3 |
|---|---|---|---|
| 4 | [5] | 6 | 7 |
| 8 | 9 | 0 | 1 |
| 2 | 3 | 4 | 5 |

ENCRYPTION KEY GENERATION

CROSS-REFERENCE TO RELATED APPLICATION

This application is a 35 U.S.C. 371 National Phase Entry Application from PCT/GB2013/051284, filed May 17, 2013, which claims the benefit of GB 1208750.8 filed on May 18, 2012, the disclosures of which are incorporated herein in their entirety by reference.

FIELD OF INVENTION

The present invention relates to encryption techniques and in particular techniques for generating encryption keys.

BACKGROUND

Techniques for encrypting data using encryption keys are well known and widely used. Techniques include symmetric key encryption whereby the same key is used to encrypt and decrypt data.

Using techniques such as this it is very important to ensure the secrecy of the key between the sender and recipient of the data and to take steps to reduce the likelihood that the secret key can be guessed by a third party.

In order to reduce as far as possible the chance that a secret key can be guessed, it is important that the secret key is generated in as random a fashion as possible—i.e. a sequence of keys generated by a key generator is ideally as unpredictable and uncorrelated as possible. Moreover, to further improve security and reduce the likelihood that an encrypted message can be intercepted and decrypted by an unauthorised third party, it is desirable to regularly update the key. However, many conventional techniques generate only a single encryption key and rely on security measures to keep this key secret.

As is known in the art, using many conventional techniques, the more random a number sequence is, the more computationally intensive it is to create. Moreover, prime numbers which are frequently used when generating encryption keys are notoriously difficult to compute (this is exemplified by efforts to identify Mersenne primes for example the Great Internet Mersenne Prime Search (http://www.mersenne.org/default.php)).

In some applications, for example mobile devices where processing power and battery life is limited, this can pose a problem.

Accordingly, it is desirable to provide an encryption key generation technique that is both optimally random whilst limiting the computational intensity required to generate the encryption keys.

SUMMARY OF INVENTION

According to a first aspect of the invention there is provided a method of generating an encryption key. The method comprises collecting a plurality of user defined variables defined by input from a user and collecting a plurality of environmental variables associated with varying environmental conditions. The method further comprises defining parameters of a plurality of scrambling functions using the user defined variables and calculating a plurality of scramble values comprising a combination of the environmental variables combined in accordance with one of the plurality of scrambling functions. The method further comprises combining the scramble values to produce a scramble code and generating the encryption key from the scramble code.

In order to ensure the robustness of encryption keys, it is important that they are generated in as unpredictable a way as possible. In other words, it must be as difficult as possible for third parties to predict an encryption key.

However, the need to improve unpredictability must be balanced against the fact that as the randomness of a series of numbers generated using conventional techniques increase so does the processing resource required to generate the sequence.

In accordance with the present invention, a technique is provided allowing robust (i.e. difficult to predict) encryption keys to be generated by, for example, a user device such as a smartphone, using seed variables that are readily available to the user device.

The technique uses variables input by a user (for example, dates, words, signature "squiggles" entered via a touchpad etc.) to define the parameters of a number of scrambling functions. The scrambling functions are then used to combine environmental variables. Environmental variables are variables that typically vary randomly and are associated with the detectable environment around a device. Environmental variables could be light levels, temperature, movement information (g-force), battery level and so on detected by components and sensors that are conventionally incorporated into user devices. Although potentially varying within a limited range of values, environmental variables have a high degree of entropy and are readily detected and processed by user devices such as smartphones.

The outputs of the various scrambling functions are then combined to produce a scramble code (i.e. a string of data) which is highly randomised and from which an encryption key can be derived.

Because the input variables can be quite small and because the process includes only two "randomising" steps (i.e. defining the scrambling functions and then applying the scrambling functions to the environmental variables), advantageously the technique requires a reduced amount of processing resource to produce random encryption keys that can then be used to encrypt data. Moreover, the source of random values to seed the process (i.e. the user defined variables and the environmental variables) are secure (i.e. hard to predict) and obtained with minimised computational requirement.

Moreover, the encryption key generation process can be readily repeated to regenerate new encryption keys, to further increase the robustness of any encryption scheme using the encryption keys. This contrasts with many conventional techniques which do not regenerate encryption keys.

Furthermore, the key can be regenerated using newly collected environmental variables whilst using the previously defined scrambling functions. Thus even if some aspect of the original key is compromised (for example the user defined variables), the fact that a new key can be generated using the environmental variables means that the replacement key will be generated with a high degree of randomness and would still be very hard (i.e. almost impossible) to predict.

Optionally, each scrambling function uses an encryption grid such that prior to combination of the environmental variables, at least one environmental variable is translated from a first value to a second value using the encryption grid. Each encryption grid is populated with a series of values defined by one or more of the user input variables.

Optionally, the combination of environmental variables is using a mathematical function associated with each grid. The mathematical function is selected based on one of the user defined variables.

Optionally, the mathematical function is based on an encryption function table mapping values to mathematical functions.

Optionally, the encryption key is generated by selecting characters from a subset of the characters of the scramble code, the selection based on a predetermined selection function.

Optionally, the predetermined selection function comprises selecting every $n^{th}$ character of the scramble code.

Optionally, the method comprises, after a determined interval, collecting a plurality of new random environmental variables; calculating a plurality of new scramble values; each new scramble value comprising a combination of the new environmental variables combined in accordance with one of the plurality of scrambling functions; combining the new scramble values to produce a new scramble code, and generating a new encryption key from the new scramble code.

Optionally, the method comprises after generation of the encryption key, transmitting the encryption key to an encryption key server.

Optionally, the encryption key is encrypted before being transmitted using an initialisation encryption key, previously provided.

Optionally, the method comprises after generation of the new encryption key, encrypting the new encryption key with the previously generated encryption key and transmitting the encrypted new encryption key to the encryption key server.

Optionally, the method comprises encrypting data with the encryption key.

According to a second aspect of the invention, there is provided a method of transmitting encrypted data. The method comprises generating an encryption key at a first device and transmitting the encryption key to an encryption key server as specified in the first aspect above; generating encrypted data at the first device by encrypting data in accordance with the encryption key; communicating the encrypted data to a second device; transmitting a copy of the encrypted key from the encryption key server to the second device, and decrypting the encrypted data at the second device in accordance with the copy of the encrypted key transmitted from the encryption key server to the second device.

Optionally, the encrypted data is communicated from the first device to the second device via a radio interface.

According to a third aspect of the invention, there is provided an encryption key generating device. The encryption key generating device comprises a user input detection means and environmental variable detection means. The user input detection means is arranged to collect input from a user thereby providing user defined variables. The environmental variable detection means is arranged to collect environmental variables associated with varying environmental conditions to which the environmental variable detection means is exposed thereby providing environmental variables. The device further comprises a processor arranged to define parameters of a plurality of scrambling functions using the user defined variables and to calculate a plurality of scramble values, each scramble value comprising a combination of environmental variables combined in accordance with one of the plurality of scrambling functions. The processor is further arranged to combine the scramble values to produce a scramble code, and generate an encryption key from the scramble code.

Optionally, for the encryption key generating device, each scrambling function uses an encryption grid such that prior to combination of the environmental variables, at least one environmental variable is translated from a first value to a second value using the encryption grid, each encryption grid populated with a series of values defined by one or more of the user input variables.

Optionally, for the encryption key generating device, the combination of environmental variables is using mathematical function associated with each grid, the mathematical function selected based on one of the user defined variables.

Optionally, for the encryption key generating device the mathematical function is based on an encryption function table mapping values to mathematical functions.

Optionally, for the encryption key generating device, the encryption key is generated by selecting characters from a subset of the characters of the scramble code, the selection based on a predetermined selection function.

Optionally, for the encryption key generating device, the predetermined selection function comprises selecting every $n^{th}$ character of the scramble code.

Optionally, for the encryption key generating device, after a determined interval, the environmental variable detection means are arranged to collect a plurality of new random environmental variables and the processor is arranged to calculate a plurality of new scramble values, each new scramble value comprising a combination of the new environmental variables combined in accordance with one of the plurality of scrambling functions. The processor is further arranged to combine the new scramble values to produce a new scramble code, and generate a new encryption key from the new scramble code.

Optionally, the encryption key generating device further comprises transmitting means, wherein after the processor has generated the encryption key, the transmitting means transmits the encryption key to an encryption key server.

Optionally, the processor encrypts the encryption key using an initialisation encryption key, previously provided before transmission.

Optionally, after the processor has generated the new encryption key, the processor encrypts the new encryption key with the previously generated encryption key and the transmitting means transmits the encrypted new encryption key to the encryption key server.

Optionally, the processor is further arranged to encrypt data with the encryption key.

According to a fourth aspect of the invention there is provided a system for transmitting encrypted data. The system comprises a first device according to the third aspect of the invention, and an encryption key server. The first device is arranged to generate an encryption key and transmit the encryption key to the encryption key server. The system further comprises a second device and the encryption key server is arranged to transmit the encryption key to the second device. The first device is arranged to encrypt data using the encryption key thereby generating encrypted data. The first device is arranged to transmit the encrypted data to the second device, and the second device is arranged to decrypt the data using the encryption key transmitted from the encryption key server.

Optionally, encrypted data is transmitted from the first device to the second device via a radio interface.

In accordance with a fifth aspect of the invention there is provided a computer program comprising computer readable instructions which when executed on a computer perform a method according to the first aspect of the invention.

In accordance with a sixth aspect of the invention there is provided a computer program product on which is stored computer readable instructions according to the fifth aspect.

Further aspects and features of the invention are defined in the claims.

BRIEF DESCRIPTION OF DRAWINGS

Embodiments of the present invention will now be described by way of example only with reference to the accompanying drawings where like parts are provided with corresponding reference numerals and in which:

FIG. 2 provides a schematic diagram illustrating the concept of encryption grids;

DETAILED DESCRIPTION

Figure 1:
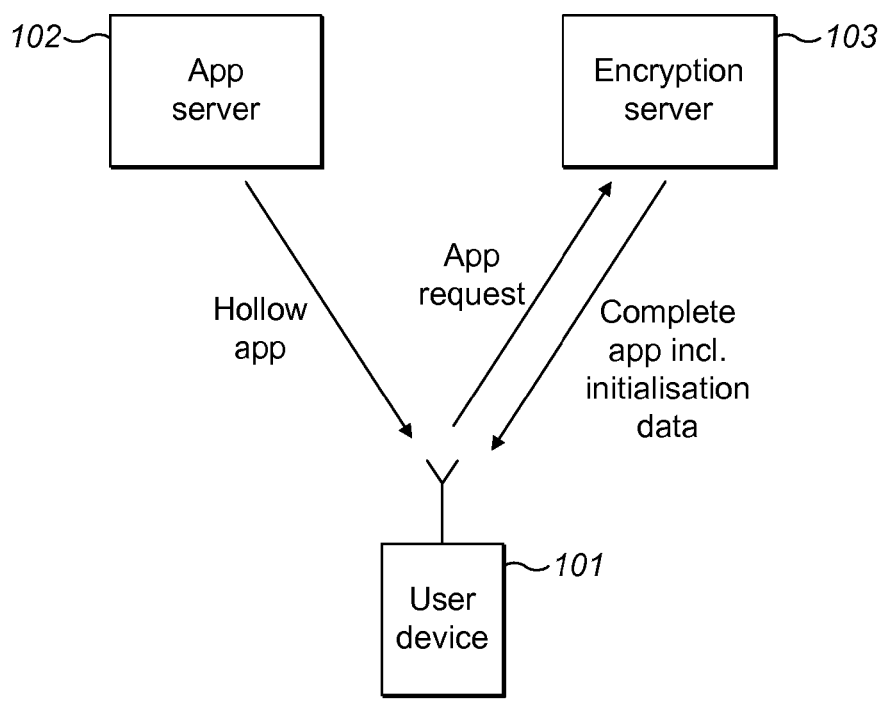
FIG. 1 provides a schematic diagram of an example of a system for generating a secure encryption key on a user device.

FIG. 1 provides a schematic diagram of an example of a system for generating a secure encryption key on a user device such as a smartphone.

A user device 101 is arranged to download a "hollow" encryption app from an app server 102 and then download a complete version of the app from an encryption key server 103.

As is known in the art, an "app" is a computer program typically stored on a remote server (e.g. the app server 103) and which is typically selected for downloading onto a user device by a user of the user device. The user device can download the app from the remote server using suitably arranged downloading software pre-installed on the user device. Once downloaded, the app is typically installed on the user device.

Although not shown, as is known in the art, the user device 101 typically comprises a processor and a memory along with a display, an input interface (such as a touch screen) for receiving user input and a transceiver for transmitting data to and receiving data from other network nodes. The user device 101 can communicate with the app server 102 and the encryption app server 103 using any suitable means, for example by using internet protocol (IP) based communication via an IP network (not shown). The user device can access the IP network using any suitable means for example using a wireless communication interface (for example provided by a cellular telecommunication network, or a wireless data connection such as WiFi).

The user device also typically includes a number of sensors and input detectors which can detect environmental variables, i.e. associated with the environment and condition around the user device. Typically, environmental variables are variables derived from particular characteristics of the environment around the user device and/or the state/condition of the user device that can be automatically detected by the user device without the need for further user input. The environmental variables would be expected to vary over time and are to a greater or lesser degree unique to the user device and are therefore difficult to predict or guess. For example, the environmental variables can relate to one or more of biological, geographical, chronological or atmospheric conditions as detected at the user device. Examples include ambient light conditions, ambient temperature, geographic location, ID of a base station to which the user device is connected, detected speed of the user device relative to one or more base stations and so on. For example the user device may include a camera device. The secure data transmission software may be arranged to control the camera device to determine a value associated with current ambient light conditions. In another example, the user device may be arranged to detect a base station identity with which the user device currently has a radio link with.

The hollow app contains a limited amount of data namely data for representing the app visually on the user device (i.e. a graphical icon) and download instruction code for identifying the encryption key server and downloading the complete version of the encryption app from the encryption key server.

When the hollow app is downloaded onto the user device 101 it is installed which causes the graphical icon to be displayed on a display of the user device 101.

A user can activate the hollow app by selecting the graphical icon displayed on the display of the user device 101 using techniques known in the art.

Upon activation of the hollow app, the user device 101 runs the download instruction code which causes the user device 101 to send a download request to the encryption key server 103 for the complete version of the encryption app. A complete version of the encryption app is then downloaded from the encryption key server 103 and is installed in the fashion of a conventional app. The complete version of the encryption app is provided with initialisation data including an authorisation key and an encryption look-up table. When the encryption app is installed, an initialisation process commences. The initialisation process is for generating an initial (i.e. first) encryption key.

Initialisation Process

In the initialisation process, the encryption app prompts a user to enter various input data (user defined variables) and also collects input data from various time-varying input values (i.e. environmental variables discussed above) that are available to the user device and that a third party would have limited or no knowledge.

The user defined variables and environmental variables are used as input to a key generation process which produces the first user generated encryption key.

The encryption app then encrypts this newly generated encryption key using the authorisation key that was downloaded with the initialisation data with the complete version of the encryption app. The encrypted version of the first user generated encryption key is then transmitted from the user device to the secure encryption key server 103.

The encryption key generation process uses the user defined variables to define the parameters of a number of scrambling functions. The environmental variables are then combined together a number of times, each time producing a scramble value. An overall scramble code is then produced based on a combination of all the scramble values. The way in which the environmental variables are combined each time is determined based on one of the scrambling functions.

A simplified example illustrating the process by which the first user generated encryption key is generated is explained in more detail below.

Simplified Initialisation Process

In one example the user defined variables input by the user are from a date (e.g. 4/1/1980) comprising eight integers. The environmental variables comprises a light level (e.g. 10 units) taken from a light sensor on the user device (e.g. a camera) and a number corresponding to a current radio access technology (RAT) with which the user device is connected to a nearby cellular network base station (e.g. 2G=2). This environmental variable will typically be available from firmware controlling a radio transceiver of the user device. This is summarised in the table below:

| Input Variables | |
|---|---|
| User defined variable | Environmental Variables |
| Apr. 1, 1980 | 10 |
| | 2 |

As mentioned above, when the complete version of the encryption app was downloaded, this included initialisation data which included an encryption look-up table. The encryption look-up table comprises a look-up table that maps input values such as integers to mathematical functions. An example of the encryption look-up table is set out in the table below:

| Encryption Look-up Table | |
|---|---|
| Input value | Function |
| 0 | Add (+) |
| 1 | Multiply (×) |
| 2 | Divide (÷) |
| 3 | Subtract (−) |
| 4 | Multiply by $x^2$ |
| 5 | Add (+) |
| 6 | Multiply (×) |
| 7 | Divide (÷) |
| 8 | Subtract (−) |
| 9 | Multiply by $x^2$ |

The encryption look-up table is generated at the encryption key server, for example at the instance that the hollow app requests the complete version of the app be downloaded. The encryption key server is arranged to generate a different encryption look-up table each time a version of the complete encryption app is downloaded. Accordingly, the chances of two or more different instances of the encryption app (e.g. downloaded by different user devices at different times) using the same encryption look-up table during the initialisation process is highly remote.

At a first step of generating the initial (first) encryption key, the encryption app is arranged to map the input user defined variable into a list of functions based on the encryption look-up table. For the examples shown above:

| Mapping input values to functions using encryption look-up table | |
|---|---|
| Input User defined variable (i.e. Apr. 1, 1980) | Mapped Function from encryption look-up table |
| 0 | Add (+) |
| 4 | Multiply by $x^2$ |
| 1 | Multiply (×) |
| 1 | Multiply (×) |
| 9 | Multiply by $x^2$ |
| 8 | Subtract (−) |
| 0 | Add (+) |

At a next step a series of encryption grids are generated. An encryption grid is generated for each input user defined variable. In the current example eight grids are produced. This is shown in FIG. 2.

FIG. 2 provides a schematic diagram illustrating the concept of encryption grids. Each grid shown in FIG. 2 comprises a four by four grid comprising 16 cells. The cells are populated with consecutive integers between 0 and 9 arranged in a sequential order from left to right, top row to bottom row. The first integer of each grid (i.e. the cell in the top left hand corner of each grid as shown in FIG. 2) corresponds to the integer for which that grid is generated. For example the first grid starts at "0" (corresponding to the first integer of 04/01/1980); the second grid starts at "4" (corresponding to the second integer of 04/01/1980); the third grid starts at "0" (corresponding to the third integer of 04/01/1980), and so on.

Each grid is associated with a mathematical function. The mathematical function associated with a particular grid is determined by the encryption look-up table and the corresponding user defined variable. The first grid is associated with the first integer of the user defined variable (i.e. 0 which is the first integer of 04/01/1980). From the look up table it can be seen that this is associated with the add (+) function.

The second grid is associated with the second integer of the user defined variable (i.e. 4 which is the second integer of 04/01/1980). From the look up table it can be seen that this is associated with the multiply by $x^2$ function.

The third grid is associated with the third integer of the user defined variable (i.e. 0 which is the third integer of 04/01/1980). As with the first grid, from the look up table it can be seen that this is associated with the add (+) function.

The grids shown in FIG. 2 comprise the scramble functions mentioned above. As can be understood, the mathematical function and the specific sequence of numbers populating each grid are determined by at least one part of the user defined variables.

At a next step, the environmental variables are combined a number of times in accordance with the scramble functions provided by the encryption grids which provide a number of scramble values.

For example, for each scramble function (i.e. encryption grid) a numerical value (i.e. scramble value) is derived. The numerical value is based on a combination of one of the environmental variables with value from the grid selected using the other environmental variable, and using the mathematical function associated with the grid. Thus a translation of the second environmental variable occurs based on the values in the grid.

For example, an integer is selected from the first grid using one of the environmental variables. The environmental variable relating to the RAT is 2. Accordingly, an integer from the grid can be selected by selecting the cell in the second column from the right and second row from the top, i.e. 5.

Next, the selected integer is combined with the other environmental variable using the function associated with that grid. The function associated with the first grid is add (+) and the other environmental variable is 10. Thus the numerical value derived from the first grid is 15.

The same process is performed to derive a numerical value from the second grid. Taking the environmental variable relating to the RAT, an integer is selected from the second grid from the cell in the second column from the right and second row from the top, i.e. 9.

The function associated with that grid is multiply by $x^2$. Taking the integer value from the grid as x, the numerical value derived from the second grid is $10 \times 9^2$ i.e. 810.

Using the same process to derive numerical values (i.e. scramble values) for each grid gives:
First grid: 15
Second grid: 810
Third grid: 15
Fourth grid: 60
Fifth grid: 60
Sixth grid: 160
Seventh grid: 8
Eighth grid: 15.

At a next step, all the numerical values derived from the grids are combined to produce a scramble code. For example the scramble values set out above can be summed to produce scramble code. For the example described above, the scramble code is 1143 (i.e. 15+810+15+60+60+160+8+15=1143).

Typically, the scramble code (i.e. the sum of the numerical values (scramble values) derived from the grids) will be a much larger number than the four digit number (1143) generated in the simplified example explained above.

This can be achieved by collecting a greater number of input user defined variables and a greater number of environmental variables during the initialisation process. As will be understood, this will result in a greater number of grids. Moreover, the mathematical functions used in the encryption look-up table can be chosen to produce larger numbers than the simple functions identified in the example encryption look-up table shown above.

Typically the scramble code may comprise a value that may be, for example 1000 characters long for normal encryption applications (e.g. securing payment authorisation) or several orders of magnitude greater than this for highly secure (e.g. military) applications, for example 1000000 characters long.

In any case, once the scramble code has been generated, a size reducing selection function is applied whereby the size of the scramble value is reduced. This can be achieved using any suitable function, for example selecting every $n^{th}$ character of the scramble code to provide an encryption key of the desired size (i.e. length). For example, to reduce the length of the scramble code by a factor of 10, every $10^{th}$ character could be selected.

As will be understood, the terms "characters" can refer to any suitable representation of the scramble code such as integers, digits, binary bits, hexadecimal characters etc. Similarly, the numerical values described above, can be represented in any suitable character format e.g. digit form, binary form, hexadecimal form etc.

The output of the selection function corresponds to the first user defined encryption key. Typically, the key generated from the selection function may be 120 characters long.

In the example described above, the user input variables comprise a date (i.e. a sequence of 8 digits). However, any suitable information that can be readily input by a user can be used (e.g. favourite colour, city of birth etc. and converted into a numerical value using, for example, an ASCII code). In some examples, if the user device includes suitable means to enable drawing input from a user, the encryption app may prompt a user to draw a picture, draw a signature, make a random "squiggle" etc. The co-ordinates of the input drawing can be converted to a numerical value and used as the user input variables. Indeed any suitable input that a user can provide that produces data from which numerical data can be derived (e.g. recording a sound, taking an image with a camera device etc.) can be used for generating the user input variables.

Other variations to the key generation process described above are also envisaged.

In the example described above, only two environmental variables are collected and combined. In other examples, more environmental variables may be collected and combined in accordance with the scrambling functions. For example, three, six or ten, or any suitable number. In some examples, only a subset of the collected environmental variables will be combined.

For example, in the example described above, only one environmental variable is translated using an encryption grid (i.e. the environmental variable associated with the RAT). However, in some examples all of the environmental variables will be translated before being combined using the mathematical function. In other examples, the number populating the encryption grids need not be consecutive starting from a lowest number (i.e. 0, 1, 2, 3, 4, 5, 6, 7, 8, 9, 0, 1, 2, 3 . . . etc.) but could be any suitable sequence of numbers (e.g. all evens followed by all odds: 0, 2, 4, 6, 8, 1, 3, 5, 7, 9, 0, 2, 4, 6 . . . etc.) or a sequence based on a Fibonacci sequence e.g. (0, 1, 1, 2, 3, 5, 8, 13, 21, 34, 55 . . . etc.).

In the example above, the scramble function is described in terms of a plurality of encryption grids. It will be understood that the term "grid" and the representation of the encryption grids in FIG. 2 are intended to illustrate the process whereby at least one of the environmental variables is translated to another value based on a translation determined by the user defined variables. When the encryption app is implemented it will be understood that a process that is mathematically equivalent (i.e. representative) to the generation and use of the encryption grids will be used although the grids themselves are not actually physically manifested and displayed.

When the first user defined encryption key has been generated, it is encrypted using the authorisation key that was downloaded with the initialisation data with the complete version of the encryption app. The encrypted version of the first user generated encryption key is then transmitted from the user device to the secure encryption key server.

Figure 3:
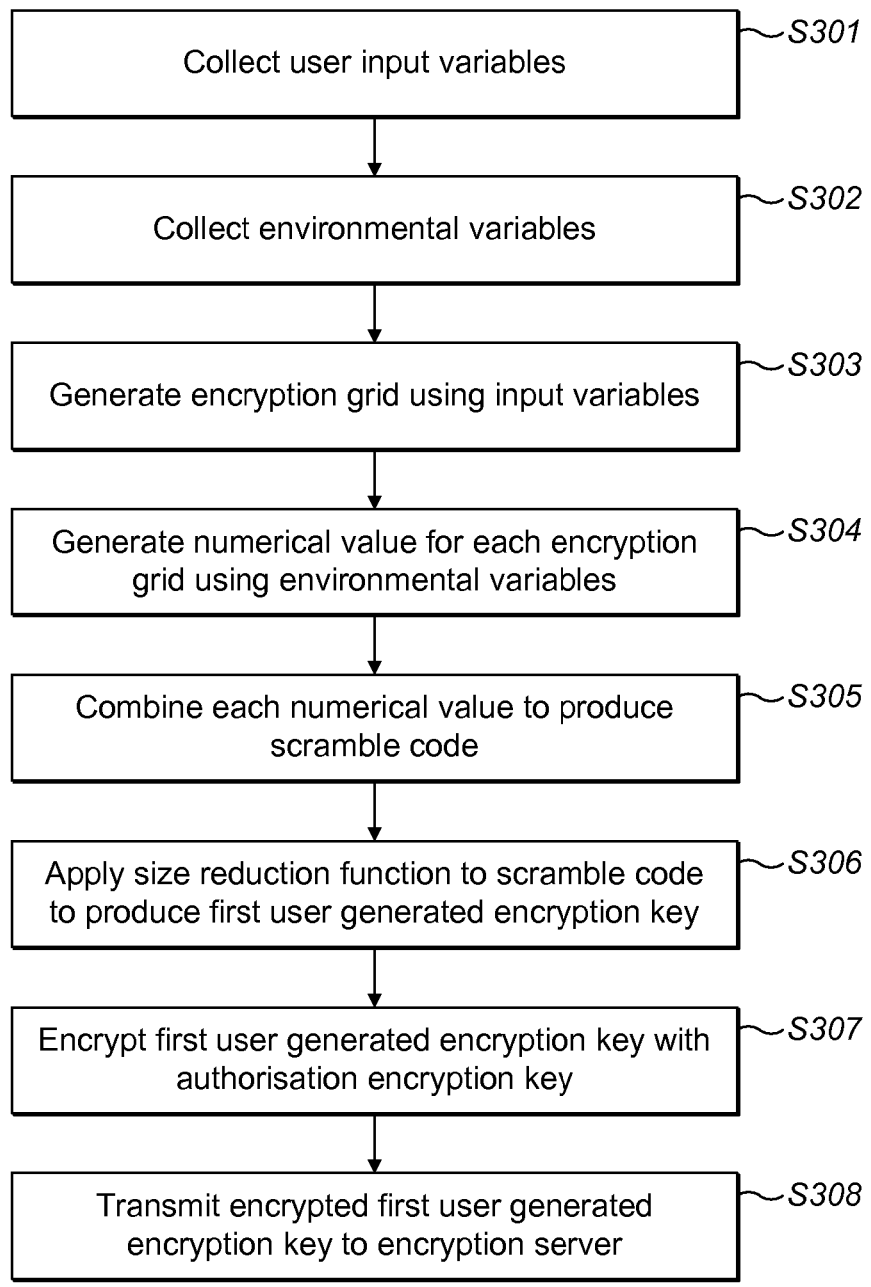
FIG. 3 provides a flow chart summarising an initialisation process in which an authorisation key is generated.

FIG. 3 provides a flow chart summarising the initialisation process.

At a first step s301 the user input variables are collected by encryption app prompting a user of the user device to input data that can be used to generate the user input variables.

At a second step s302 the environmental variables are collected by the encryption app controlling the user device to collect various time-varying variables that can be detected by the user device.

At a third step s303 a number of encryption grids are generated using the user input variables as described above.

At a fourth step s304 numerical values are generated for each encryption grid using the collected environmental variables.

At a fifth step s305 the numerical values generated for each encryption grid are combined to produce a scramble code.

At a sixth step s306 a size reduction function is applied to the scramble code to produce the first user generated encryption key.

At a seventh step s307 the first user generated encryption key is encrypted with the authorisation key.

At an eighth step s308 the encrypted first user generated encryption key is transmitted to the encryption key server.

Figure 4:
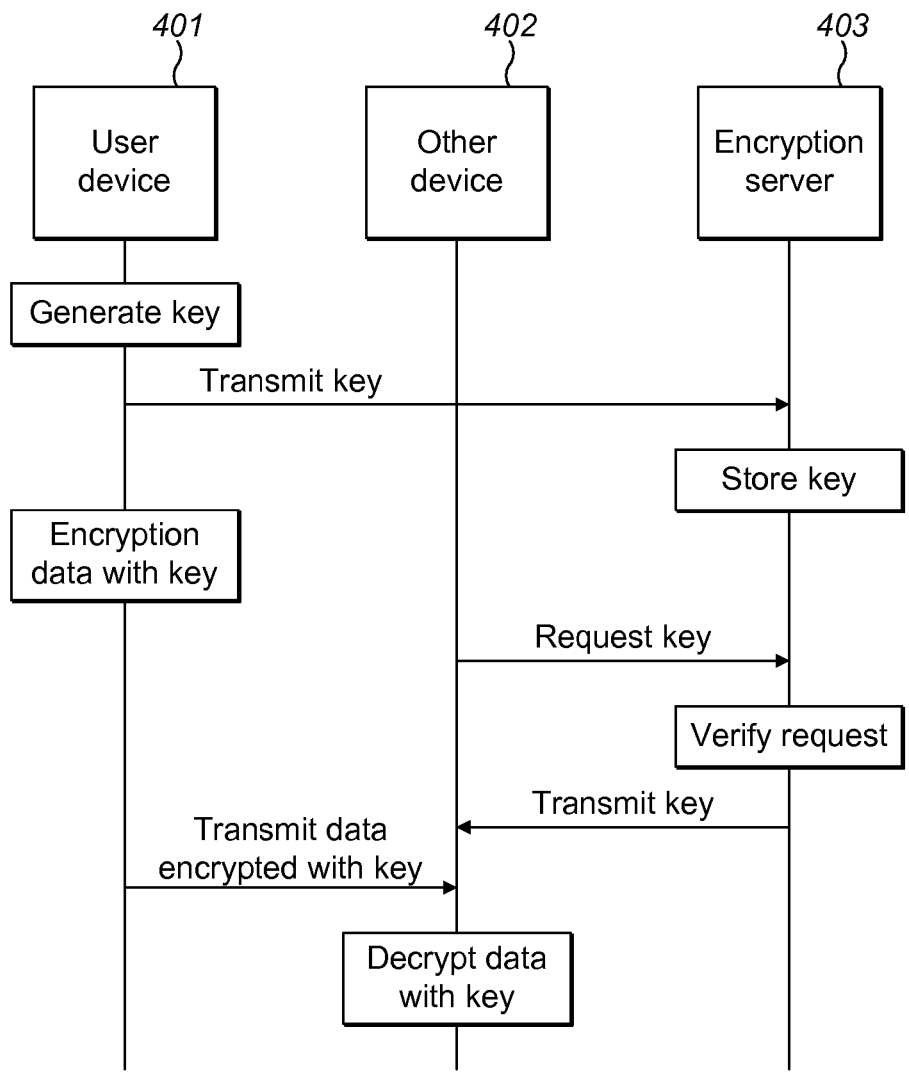
FIG. 4 provides a simplified schematic diagram illustrating an example of a process by which data encrypted with an encryption key can be transmitted from a user device to another device.

Once the secure encryption key server has received a copy of the first user generated encryption key the user device is able to communicate secure data to another node (e.g. other device or server) as illustrated in the example shown in FIG. 4.

Example Data Encryption Process

FIG. 4 provides a simplified schematic diagram illustrating an example of a process by which data encrypted with an encryption key as described above can be transmitted from a user device 401 to another device 402 (such as another user device, server or any other network device or node) once the encryption key has been transmitted from the user device 401 to an encryption key server 403.

The user device 401 generates and encrypts the key and transmits it to the encryption key server as described with reference to FIG. 3. The encryption key server 403 then decrypts and stores the user generated encryption key.

When a need arises for the user device 401 to transmit encrypted data to the other device 402 (for example by virtue of any suitable interaction between the user device 401 and the other device 402, not shown in FIG. 4), the user device encrypts the data with the encryption key.

As will be understood, any suitable method for encrypting the data with the encryption key can be used. For example any suitable block cipher or stream cipher can be used. Any suitable key encryption technique using for example a subtractive key encryption process or a multiplicative key encryption process can be used.

The other device 402 transmits a key request to the encryption key server. Typically, the encryption key server will perform a suitable verification of this request (using any technique known in the art, for example by verifying that the other device 402 is on a list of approved network nodes). On successful completion of the verification of the request, the encryption key server transmits a copy of the encryption key to the other device 402. Meanwhile, the user device 401 transmits the encrypted data to the other device. Upon receipt of both the encrypted data from the user device 401 and the copy of the encryption key from the encryption key server 403, the other device 402 can decrypt the encrypted data.

As will be understood, the data encryption process described above can be used to transmit any suitable type of data. In some examples, the technique could be used for securely transmitting data files, such as documents, spread sheets, image data, video data and so on.

Moreover encrypted data can be transmitted between a first device (e.g. user device 401) and a second device (e.g. other device 402) using any suitable channel. If the first and second devices where smart phones, the encrypted data would be transmitted via a PLMN or WiFi connection to an IP network in the same way that data is conventionally transmitted between cellular user devices. However, in some examples, both the first device and second device may communicate data directly to each other if provided with suitable radio transceivers. This could be achieved using a suitably adapted radio interface such as Bluetooth, Zigbee and so on.

In other examples, the encrypted data could be authorisation data for authorising a process enabling the user device 401 to authorise a payment to be made. For example, the data could be payment authorisation data sent from user device 401 authorising the other device 402 (which could be a bank server) to initiate a payment. In such examples there may be an intermediate device (not shown) such as a second user device. In such examples, if a user of the user device 401 wishes to make a payment to a user of the second user device, payment authorisation data, indicating a payment amount for example, could be generated on the user device 401 and encrypted using the encryption key. The payment data (still encrypted) could then be transmitted to the second user device. The second user device could then transmit this, as a payment request message, to the bank server (other device 402). If the bank server (other device 402) can decrypt the payment message using the encryption key (the bank server 402 having previously received the encrypted key from the encryption key server 403), this indicates that the payment request is legitimate and a payment can be authorised from an account of a user of the user device to an account of a user of the second user device.

Reconfiguration Process

Periodically, the encryption app running on the user device is arranged to perform a reconfiguration process, whereby the user defined key is re-generated (i.e. a new user defined encryption key is generated) and communicated back to the encryption key server.

This reconfiguration process is explained in more detail with reference to FIG. 5.

Figure 5:
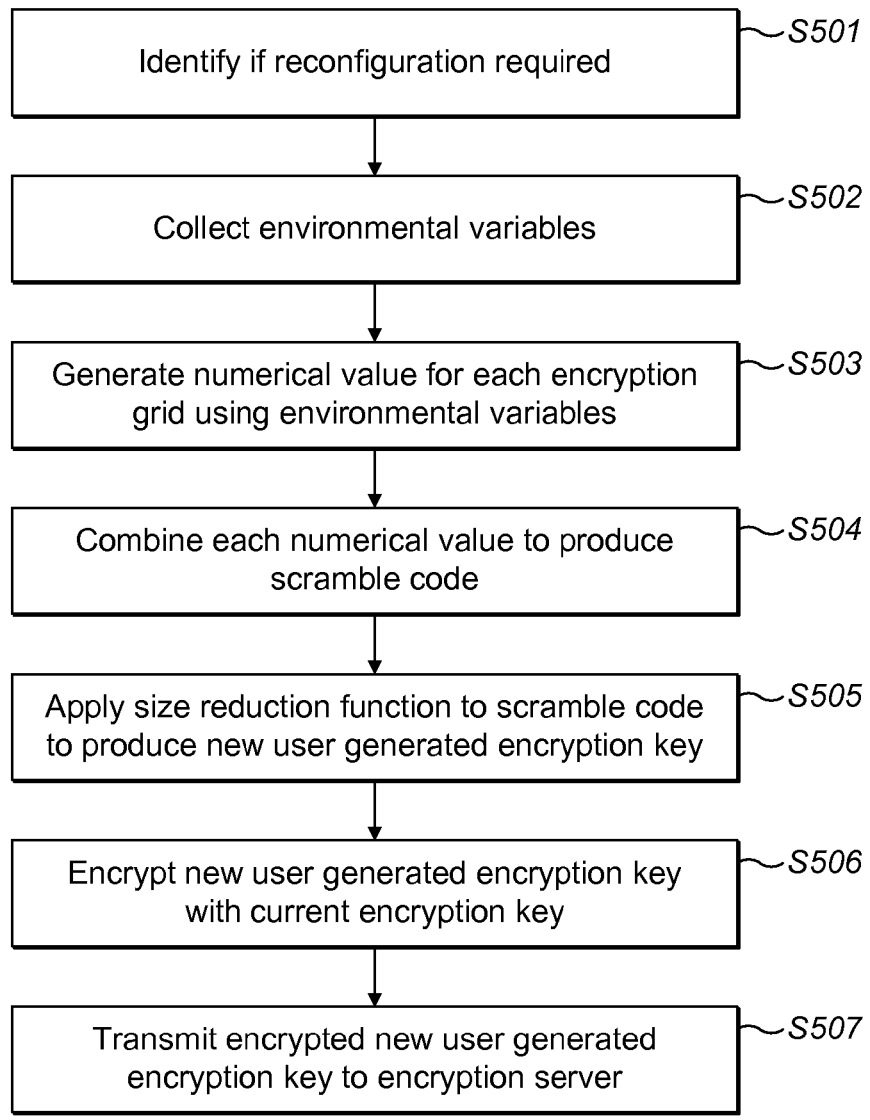
FIG. 5 provides a flow chart summarising a reconfiguration process in which a replacement encryption key is generated, and FIG. 6 provides a flow diagram illustrating a process for generating a encryption key in accordance with the present technique.

FIG. 5 provides a flow chart summarising the reconfiguration process. At a first step s501 it is determined that a reconfiguration is required.

In some examples the encryption app determines that the reconfiguration process is performed at set intervals (for example once every 24 hours). Alternatively, the frequency with which the reconfiguration process occurs can be determined by one of the input variables. For example, the first digit of the user input variable 04/01/1980. This could determine that the reconfiguration process occurs every ten hours. Alternatively, the interval until the first reconfiguration could be determined by the first digit of the user input variable, the interval until the second reconfiguration could be determined by the second digit of the input variable, the interval until the third reconfiguration could be determined by the third digit of the input variable and so on. Thus, taking Apr. 1, 1980 as the input variable, the intervals between the reconfiguration processes being performed could be: 10 hours, 4 hours, 10 hours, 1 hour, 9 hours, 8 hours, 10 hours and so on, for example repeating this pattern on a loop or using some other input variable to randomise the intervals between reconfiguration.

At a second step s502 the environmental variables are collected by the encryption app controlling the user device to collect various time-varying variables that can be detected by the user device.

At a third step s503 numerical values are generated for each encryption grid using the collected environmental variables.

At a fourth step s504 the numerical values generated for each encryption grid are combined to produce a scramble code.

At a fifth step s505 a size reduction function is applied to the scramble code to produce a new user generated encryption key.

At a sixth step s506 the first user generated encryption key is encrypted with the current user generated encryption key (if this is the first time the reconfiguration process has been performed then the current user generated encryption key will be the first user generated encryption key).

At a seventh step s507 the encrypted first user generated encryption key is transmitted to the encryption key server.

In some examples, before steps s502 to s507 are performed the encryption app performs a spawning process to further enhance security. The app contains code which when executed causes a copy of the app to be generated at a new memory location within the user device. This copied version of the encryption app performs the reconfiguration process shown in FIG. 5, and once complete, deletes the original version of the encryption app.

In some examples, during the reconfiguration process, further aspects of the encryption key generation process are modified. For example, the encryption grids may be modified by modifying the mathematical functions associated with each grid. This can be achieved by modifying the encryption look-up table in accordance with one of the newly collected environmental variables. For example, the "input values" shown in the encryption look-up table could be replaced with variables (e.g. integers) derived from the newly collected environmental variables.

As described above, the encryption key is generated by applying a selection function to the scramble code which selects a subset of the data forming the scramble code. In some examples, unused data from the scramble code can be used to seed other security functions (such as app firewalls) operating within the encryption app.

In the examples described above, the process of generating the encryption key has been described mainly in terms of a downloaded app running on a user device such as a smartphone. However, it will be understood that other suitable devices such as personal computers, tablet devices, games consoles, personal digital assistants (PDAs), personal media players, set-top boxes etc. could be used. Alternatively, the process could be run on a server or other networked or distributed node or entity. In other words, any device with a suitable processor and on which is loaded a computer program comprising computer readable instructions for implementing the key generation technique described above can be used to generate encryption keys in accordance with the present technique.

Figure 6:
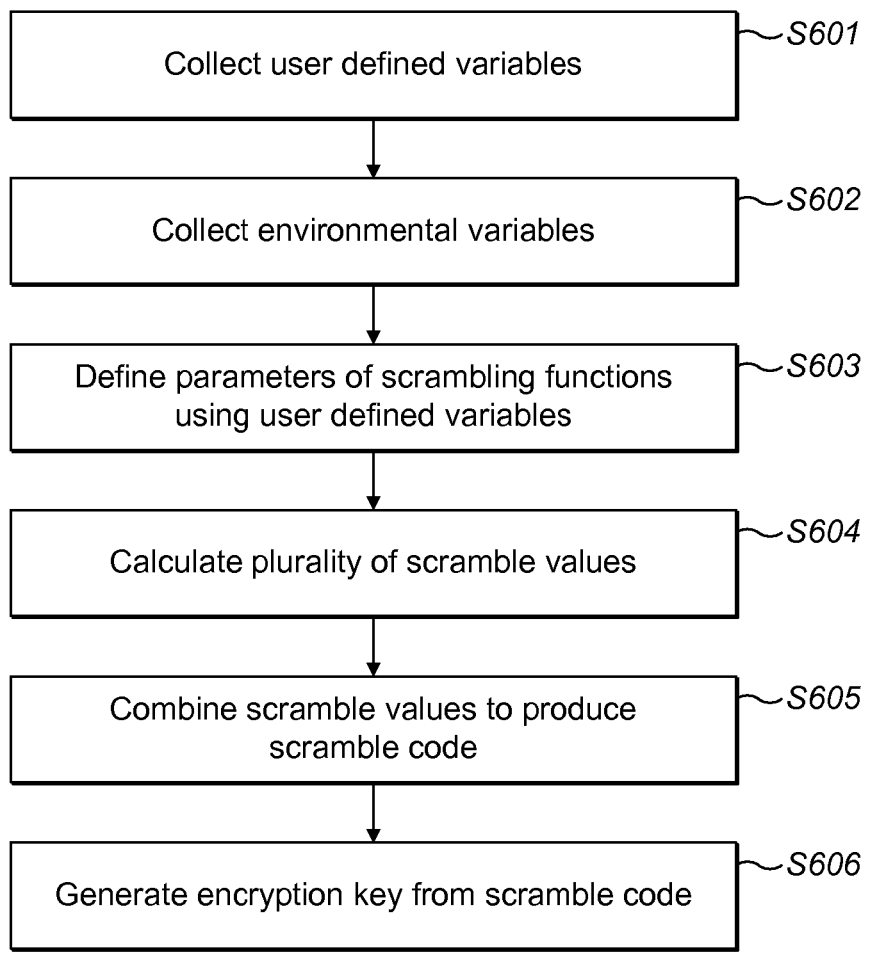

FIG. 6 provides a flow diagram illustrating a process for generating a encryption key in accordance with the present technique.

At a first step s601 a plurality of user defined variables defined by input from a user are collected;

At a second step s602 a plurality of environmental variables associated with varying environmental conditions are collected;

At a third step s603 parameters of a plurality of scrambling functions are defined using the user defined variables;

At a fourth step s604 a plurality of scramble values are calculated, each scramble value comprising a combination of environmental variables combined in accordance with one of the plurality of scrambling functions;

At a fifth step s605, the scramble values are combined to produce a scramble code, and At a sixth step s606, an encryption key is generated from the scramble code.

Various modifications and adaptations can be made without departing from the scope of the invention.

For example, the user defined variables referenced above, have been described mainly in terms of a user physically entering information into a device such as a user device. However, in other examples, for example where the key generation process is run on software running on a server that is physically remote from a user, the user defined variables could be generated by the server itself based on information previously provided by a user or by randomly generated data.

Furthermore, in the examples above the encryption key generation technique has been described mainly in terms of a network node (e.g. a user device) sending encrypted data to another network node (e.g. a payment authorisation server or other user device). As will be understood, the encrypted data can be transmitted between nodes using any suitable medium. However, in some examples the technique can be used to secure a data communication channel between two devices, connected by, for example, a radio interface.

It will be understood that the particular component parts of which the various systems described above are comprised are in some examples logical designations. Accordingly, the functionality that these component parts provide may be manifested in ways that do not conform precisely to the forms described above and shown in the diagrams. For example aspects of the invention, particularly the processes running on the user device and the encryption key server may be implemented in the form of a computer program product comprising instructions (i.e. a computer program) that may be implemented on a processor, stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

The invention claimed is:

1. A computer-implemented method of generating an encryption key, said method comprising:
   A. detecting a plurality of environmental variables associated with varying environmental conditions using at least one of a sensor and an input device;
   B. collecting a plurality of further variables;
   C. defining parameters of a plurality of scrambling functions using said further variables;
   D. calculating a plurality of scramble values, each scramble value comprising a combination of said environmental variables combined in accordance with one of said plurality of scrambling functions;
   E. combining said scramble values to produce a scramble code;
   F. generating said encryption key from said scramble code; and
   G. detecting a plurality of new environmental variables using at least one of said sensor and said input device;
   H. calculating a plurality of new scramble values, each new scramble value comprising a combination of said new environmental variables combined in accordance with one of said plurality of scrambling functions;
   I. combining said new scramble values to produce a new scramble code, and
   J. generating a new encryption key from said new scramble code.

2. A method according to claim 1, wherein said further variables comprise one of:
values physically input by a user; values generated by a server based on information previously provided by a user; and randomly generated data.

3. A method according to claim 1, wherein each of said scrambling functions uses an encryption grid such that prior to combination of said environmental variables, at least one of said environmental variables is translated from a first value to a second value using said encryption grid, each of said encryption grids being populated with a series of values defined by one or more of said further variables.

4. A method according to claim 3, wherein said combination of environmental variables is performed using a mathematical function associated with each of said encryption grids, said mathematical function being selected based on one of said user defined variables.

5. A method according to claim 4, wherein said mathematical function is based on an encryption function table mapping values to mathematical functions.

6. A method according to claim 1, wherein said encryption key is generated by selecting characters from a subset of characters of said scramble code, said selection being based on a predetermined selection function.

7. A method according to claim 6, wherein said predetermined selection function comprises selecting every nth character of said scramble code.

8. A method according to claim 1, wherein said steps G-J, are performed after a predetermined interval.

9. A method according to claim 8, wherein step J is performed repeatedly at set intervals.

10. A method of transmitting encrypted data comprising,
at a first device, generating an encryption key according to said method of claim 1 and transmitting said encryption key to an encryption key server;
generating encrypted data at said first device by encrypting data in accordance with said encryption key;
communicating said encrypted data from said first device to a second device;
transmitting a copy of said encryption key from said encryption key server to said second device, and
decrypting said encrypted data at said second device in accordance with the copy of said encryption key and repeating said steps for said new encryption key generated in said method of claim 1.

11. An encryption key generating device comprising;
environmental variable detection means comprising at least one of a sensor and an input device configured to detect environmental variables associated with varying environmental conditions to which said environmental variable detection means are exposed thereby providing environmental variables, wherein
said device further comprises a processor configured to define parameters of a plurality of scrambling functions using further variables and to calculate a plurality of scramble values, each scramble value comprising a combination of environmental variables combined in accordance with one of said plurality of scrambling functions, wherein said processor is further configured to combine said scramble values to produce a scramble code, and generate an encryption key from said scramble code; wherein
said environmental detection means is configured to detect a plurality of new environmental variables, and said processor is configured to calculate a plurality of new scramble values, each new scramble value comprising a combination of said new environmental variables combined in accordance with one of said plurality of scrambling functions and to combine said new scramble values to produce a new scramble code, and to generate a new encryption key from said new scramble code.

12. An encryption key generating device according to claim 11, wherein said further variables comprise one of:
values physically input by a user; values generated by a server based on information previously provided by a user; and randomly generated data.

13. An encryption key generating device according to claim 12, said device further comprising a user input detection means arranged to collect input from a user.

14. An encryption key generating device according to claim 13, wherein each scrambling function uses an encryption grid such that prior to combination of said environmental variables, at least one of said environmental variables is translated from a first value to a second value using said encryption grid, each of said encryption grids being populated with a series of values defined by one or more of said further variables.

15. An encryption key generating device according to claim 11, wherein said encryption key is generated by selecting characters from a subset of characters of said scramble code, said selection being based on a predetermined selection function.

16. An encryption key generating device according to claim 15, wherein said predetermined selection function comprises selecting every nth character of the scramble code.

17. An encryption key generating device according to claim 11, wherein said encryption key generating device is configured to perform said steps of generating said new encryption key after a determined interval.

18. An encryption key generating device according to claim 11, further comprising transmitting means, said processor being configured to transmit said new encryption key to an encryption key server.

19. A system for transmitting encrypted data, said system comprising;
a first device comprising an encryption key generating device according to claim 11,
an encryption key server, said first device arranged to generate encryption keys and transmit said encryption keys to said encryption key server, and
a second device, said encryption key server arranged to transmit said encryption keys to said second device, wherein said first device is arranged to encrypt data using one of said encryption keys thereby generating encrypted data, and to transmit said encrypted data to said second device, and said second device is arranged to decrypt said data using said corresponding one of said encryption keys transmitted from said encryption key server.

20. A non-transitory computer readable medium comprising computer readable instructions which when executed on a computer perform a method comprising the steps of:
A. detecting a plurality of environmental variables associated with varying environmental conditions using at least one of a sensor and an input device;
B. collecting a plurality of further variables;
C. defining parameters of a plurality of scrambling functions using said further variables;
D. calculating a plurality of scramble values, each scramble value comprising a combination of said environmental variables combined in accordance with one of said plurality of scrambling functions;

E. combining said scramble values to produce a scramble code;
F. generating said encryption key from said scramble code; and
G. detecting a plurality of new environmental variables using at least one of said sensor and said input device;
H. calculating a plurality of new scramble values, each new scramble value comprising a combination of said new environmental variables combined in accordance with one of said plurality of scrambling functions;
I. combining said new scramble values to produce a new scramble code, and
J. generating a new encryption key from said new scramble code.

\* \* \* \* \*